June 20, 1939. S. L. CLOTHIER ET AL 2,163,537
TELEVISION METHOD AND APPARATUS
Filed Nov. 18, 1935 2 Sheets-Sheet 2

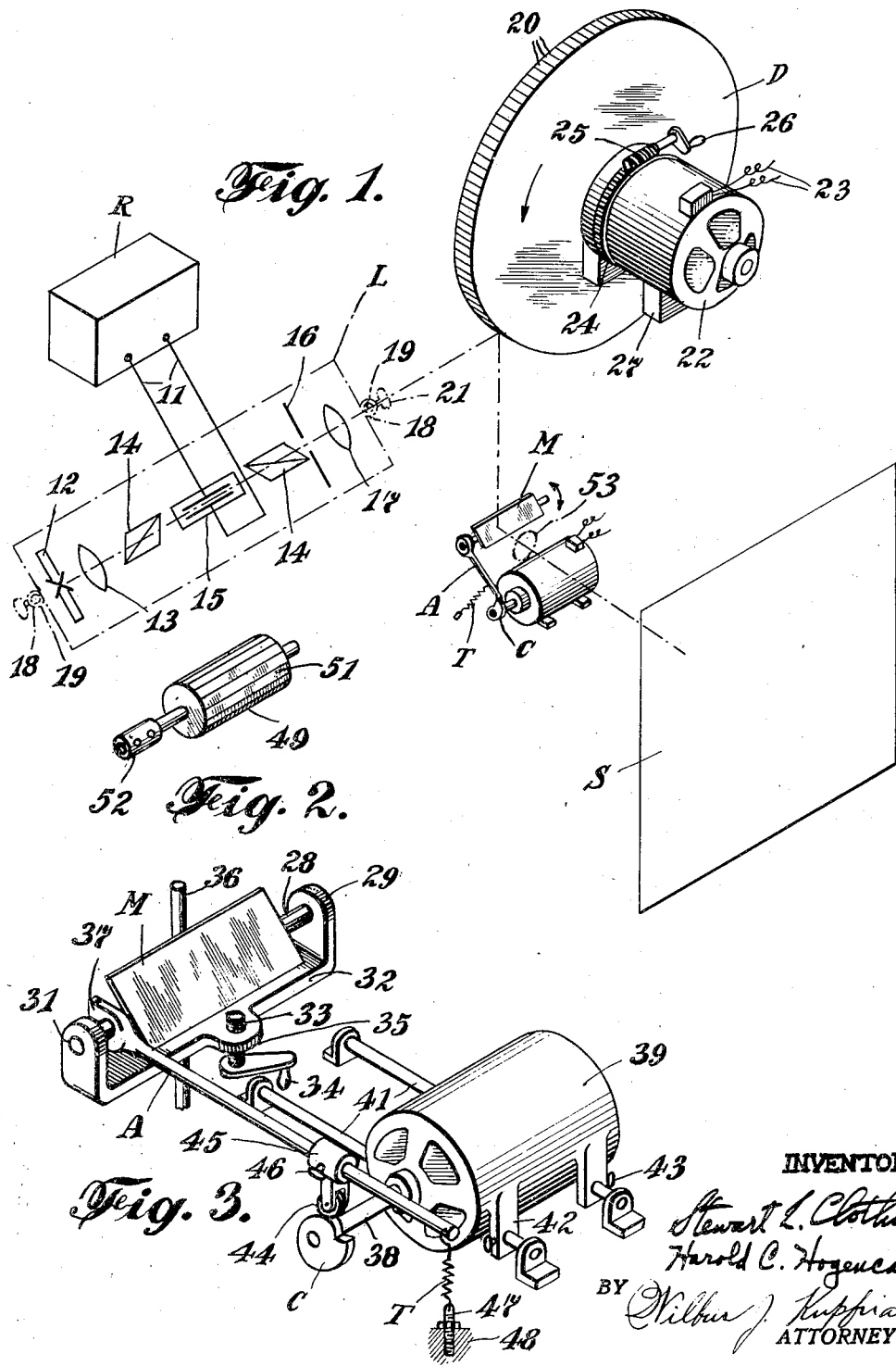

Stewart L. Clothier
Harold C. Hogencamp INVENTORS
BY Benj. R. Newcomb
ATTORNEY.

Patented June 20, 1939

2,163,537

UNITED STATES PATENT OFFICE 2,163,537

TELEVISION METHOD AND APPARATUS

Stewart L. Clothier, Irvington, and Harold C. Hogencamp, Maplewood, N. J., assignors to Kolorama Laboratories, Inc., Newark, N. J., a corporation of New Jersey Application November 18, 1935, Serial No. 50,316

10 Claims. (Cl. 178—7.6)

This invention relates to television and more particularly to improved methods and apparatus for mechanical scanning.

Heretofore, mechanical scanning devices have proven unsatisfactory in television transmitters and receivers largely because they are incapable of obtaining a degree of resolution sufficient to provide proper definition or detail in the image.

In the present invention means have been provided to overcome many of the deficiencies of prior art structures so as to produce a new and improved method and apparatus for mechanical scanning which possesses marked advantages over those previously known. With the present invention it is possible to obtain definition which equals or surpasses that obtained by electron scanning methods, without a sacrifice of the simplicity in structure, or operation of mechanical scanning devices.

The principal object therefore, of the present invention is to provide improved methods and apparatus for television scanning.

A second object of this invention is to provide an oscillating scanning element of improved design and operation provided with proper adjustment means.

A further object of the invention is to provide mechanical scanning means for obtaining satisfactory resolution of an image into its elements without any necessity for excessive speed of operation.

Further objects and advantages of this invention will become readily apparent from the following description and the accompanying drawings showing one arrangement embodying features of the invention.

In the drawings:

Fig. 1 is an isometric view in diagrammatic form of one possible arrangement of the invention.

Fig. 2 is an isometric view of a rotatable drum which may be employed as another form of scanning means.

Fig. 3 is an enlarged view of the oscillating scanning means shown in Fig. 1 showing adjustment means.

Figure 4:
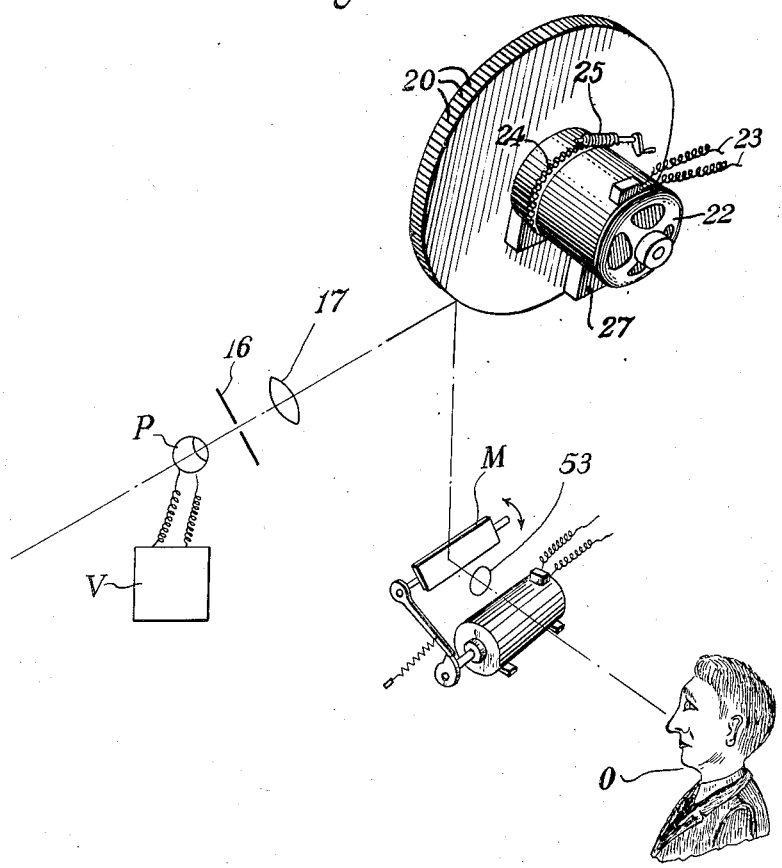
Fig. 4 is an isometric view in diagrammatic form of one arrangement operating as a scanner for a television transmitter.

In Fig. 1 of the drawings, a preferred form of the invention is shown with other elements combined as a picture receiving means. A pencil or beam of modulated light issuing from a light-modulating means L is conveyed to a rotatable disc D, the periphery of which is provided with a series of mirror surfaces each of which is identical with every other and normal to a radius of the disc. The beam of light, while of condensed form, is nevertheless received upon more than one mirror surface of the disc D and is reflected from the surfaces upon an oscillating mirror M, the axis of which is disposed perpendicularly to the axis of the disc D. An arm A is secured to the mirror M and extends therefrom so as to contact the cam C. As the cam rotates, the mirror M pivots about its axis in one direction and then by reason of the shape of the cam C and the action of tension spring T is more quickly returned to the starting position. The light beam is thus reflected from two moving and mutually perpendicular mirrors and covers every portion of a screen S.

Referring again to the drawings and more particularly to Figs. 1 and 3, a form of television receiver embodying principles of the invention comprises a receiving instrument R the purpose of which is to amplify the succession of electrical impulses or images received from the television transmitting station. If the television impulses are received over conducting wires the receiving instrument R may comprise simply an amplifier of the necessary frequency range; if the impulses comprise modulated radio frequency waves, they must be detected before they are amplified. In either case, the amplified impulses are conducted to a light-modulating unit L through wires 11. The light-modulating unit L may be of any desired construction capable of emitting a beam or pencil of light, the intensity of which is regulated, controlled and varied according to and by the amplified television impulses. In the drawings the light-modulating unit L is represented as comprising a source of high-intensity illumination, as for instance an electric arc, or lamp 12. A lens or concave mirror 13 is spaced from the light source in optical relation thereto, so as to direct the light rays into a parallel beam through a light modulator and to concentrate an image of the source 12 upon or closely adjacent to the periphery of the disc D. In Fig. 1 such a modulator comprises light-polarizing means such as a pair of Nicol prisms 14 spaced apart from one another, and a Kerr cell 15 interposed in operative relation between the respective prisms 14. The Kerr cell 15 is positioned so that the beam of light traverses the dielectric-filled space between the plates, which plates are respectively connected with the wires 11. The manner in which the Kerr cell modulates the beam of light in accordance with the potential across the plates is a matter of common knowledge and need not be given further mention. The beam of light passes from the modulator through an apertured diaphragm or adjustable iris 16 and through a focussing lens or lens system 17 which is adjusted so as to form an image of the illuminated aperture in space, or a real image of the aperture directly upon the screen S. As the image of the aperture represents an elemental area of the entire picture image upon the screen, and since it may be desirable to vary the size of the elemental area in accordance with the number of scanning lines utilized for the entire picture, the lens 17, of proper focal length may be adjustably positioned either within or outside of the light-modulating unit L to produce the desired size of elemental area. Any suitable housing as represented in broken lines in Fig. 1 may be provided for the unit L if the respective parts are mounted in close relationship. Mounting and adjusting means of any convenient form are provided for the unit L so as to admit of adjusting its position with respect to the remainder of the apparatus. In the drawings such adjusting mechanism is diagrammatically shown to consist of a sleeve 18 secured to each end of the unit L and adapted to slide upon vertically positioned rods 19. Thumb-nuts 21 hold the sleeves 18 and the unit L in adjusted position on the rods 19. If desired, the housing of the light-modulating unit L may engage a vertically extending rotatable screw, so that regulation of its vertical position may be effected with a single control.

Spaced from the light-modulating unit L but in a position to intercept the beam of light is a disc D, the periphery of which is provided with numerous tangentially-positioned mirrored surfaces 20, each of which is in a plane of its own parallel with a plane containing the axis of the disc D. Preferably the disc D comprises a circular sheet of metal, glass, or similar material, the circumferential edge of which is ground or otherwise formed into a series of smooth plane surfaces which may be coated or polished to increase reflecting efficiency. If desired the disc D may be built up of hub, spoke, and felloe members, or otherwise constructed, so as to insure adequate rigidity, it being possible with such construction to considerably reduce the rotational moment of inertia. The mirrored surfaces may comprise small rectangular strips of glass, silvered either on the back or front and secured in any convenient manner as by cement to the periphery of the disc. An annular strip of silver, brass or other material may be mounted about the periphery of the disc and may be formed into a series of reflecting surfaces either before or after mounting.

Means are provided for imparting rotational movement to the disc D in synchronism with a corresponding disc or equivalent mechanism at the transmitting station. Preferably a synchronous motor 22 operating through wires 23 from a power line of standardized frequency is secured to the disc D although it is possible that other forms of prime movers may be used so long as they are synchronized in some manner with the sending or transmitting station. Adjusting mechanism is provided in conjunction with the motor 22 and disc D so as to provide for relative movement between the disc and other elements of the apparatus to obtain proper phasing. Such adjustment may be made through the use of a ring gear 24, a worm 25 secured against axial movement and a handle 26. The ring gear 24 is operatively connected to an adjustable field in the motor 22 controlling the axial position of the field and hence the relative position of the mirrored surfaces. If desired, the entire motor frame may be rotated through an arc upon its cradle 27, or the motor 22 and the disc D may be moved vertically as a unit by mechanism functioning in a manner similar to that employed with the light-modulating unit L.

Referring now especially to Fig. 3 of the drawings, an oscillating mirror M is mounted in adjustable spaced relation to the disc D, to receive the light beam from disc D. A shaft 28 is secured to the mirror M in any convenient manner and preferably extends longitudinally along an axis contained in the plane of the mirror M. The shaft 28 is journalled within bearings 29 and 31 so as to be free to oscillate about its axis. Preferably the bearings 29 and 31 are integrally secured as by a web 32 to form a unit which may be adjusted vertically in any convenient manner. If desired, this adjustment may be made with mechanism shown diagrammatically in Fig. 3 and consisting of a threaded rod or screw 33 having an operating handle 34 and engaging a threaded boss 35 formed on the web 32. The threaded rod 33 is held against vertical displacement in a conventional manner so that as the rod is rotated, the entire unit consisting of the mirror M and its mounting means is constrained to move with respect to a guide 36 in a vertical plane.

An arm A is secured at one end of the shaft 28 preferably by means of a resilient yoke 37 which admits of selectively adjusting the arm A pivotally with respect to the shaft 28 so as to permit roughly positioning the mirror M with respect to the screen S. A cam C is preferably interchangeably secured to the shaft 38 of an auxiliary motor 39. If desired, the motor 39 may be provided with an adjustable field which may be pivoted about the axis in a manner obtainable with the motor 22. The motor may move to and from the oscillating mirror M for instance on guide rails 41 which slidably connect with lugs 42 depending from the motor frame. Locking mechanism, such as thumb screws 43 secure the motor in adjusted position longitudinally with respect to the rails 41. A cam follower 44, consisting preferably of a wheel engages the cam surface and is rotatably mounted within a forked rider 45, slidably upon the arm A so as to conform with the selected position of the motor 39 upon the rails 41. A locking device as a thumb screw 46 maintains the rider 45 in adjusted position. Resilient means are provided to urge the follower 44 upon the surface of the cam C and may consist of a tension spring T extending between the arm A and a screw 47 adjustably threaded in a supporting base 48.

A rotatable drum 49, shown in Fig. 2, and provided with a plurality of mirrored surfaces 51 may replace the oscillating mirror structure and may be mounted upon the shaft of a suitable synchronous motor by means of a coupling 52.

The disc D, the mirror M, and the light-modulating unit L are positioned with respect to one another so that a beam of light emanating from the unit L is reflected from the mirrored surfaces 20 upon the oscillating mirror M or the drum 49. Preferably the unit L is positioned so that the beam strikes the periphery of the disc D in a plane parallel to the plane of the disc face, and at a point from which a radius forms an angle of approximately forty-five degrees with the vertical and with the horizontal. The beam is preferably deflected downwardly in a generally vertical plane and strikes the mirror M, oscillating about an axis positioned in a plane perpendicular to the plane containing the axis of the disc D.

The rotary movement of the disc D will cause the beam to be swept successively along the mirror M longitudinally at a frequency depending upon the number of mirrors upon the disc D and upon the rate at which the disc rotates. It is desirable that the disc be provided with at least ninety, and preferably as many as three-hundred and sixty mirrors, as the more reflecting surfaces provided, the greater definition is obtained with a given speed of rotation. Satisfactory results have been obtained with one-hundred and eighty surfaces formed in the periphery of a disc having a diameter of approximately one foot. In this case each surface subtends an arc of two degrees, which represents one-half the angle of divergence thru which the beam is swept successively. The mirror M must therefore be sufficiently long as to contain the beam reflected by the respective mirrors as each moves through the arc which it subtends on the periphery of the disc D. If three-hundred and sixty surfaces are used, the angle of divergence is only two degrees. The higher the speed of rotation the better is the definition obtained. As an example, a disc provided with three-hundred and sixty surfaces rotating at 3600 R. P. M. reproduces twenty-four images per second of nine hundred lines each. If the images are formed on a screen ten feet square, the texture appears perfect to an observer standing not closer than thirty feet therefrom. The disc D causes the modulated light beam to be swept across the mirror M to produce horizontal scanning of the screen S.

Vertical scanning is produced by oscillatory movement of the mirror M, the degree of movement corresponding closely with the arc subtended by each surface on the disc D. In other words, if the angle of divergence produced by the disc is four degrees as when one hundred and eighty faces are used, the mirror M need only arc through substantially two degrees, provided the screen S is square. The arcuate motion produced by means of a cam C and a follower 44 is preferably a saw-tooth motion, i. e., one which comprises a uniform slow angular motion in one direction during which scanning takes place, and a quick motion in the opposite direction to return the mirror to its initial position. The vertical scanning is thus always performed in the same direction and sense, as for instance from bottom to top. After the mirror M has been properly positioned with respect to the disc D and in proper spaced relation to the screen S, the mirror is first adjusted angularly by loosening the fastening means in the yoke 37 so as to cause the beam to be reflected in the general direction of the screen S. Further adjustment for framing the image on the screen S is obtained by rotating the screw 33 which causes the entire mirror structure to move in a vertical plane. Means (not shown) are provided to take end thrust of the screw 33 so as to inhibit axial motion thereof. The arc through which the mirror M moves is adjusted by sliding the motor 39 on the rails 41 and the rider 45 on the arm A. As an example, a cam causing a vertical travel of one quarter inch, produces an arcuate motion of two degrees when the follower is spaced five and five-eighths inches from the pivot of the mirror M. A greater arc is produced by moving the motor and follower closer to the mirror M with the same cam. The cam rotates at a speed equal to the number of pictures or images desired per second. If twenty-four pictures per second are desired the motor 39 rotates the cam C at a uniform speed of 1440 R. P. M. The motor 39 is preferably synchronized either mechanically or electrically with the corresponding motor at the transmitting station. The motors operate satisfactorily from a common source of alternating current. Instead of obtaining the saw-tooth type of mirror motion with a cam, it may be produced with an oscillograph operated with a saw-tooth shaped electrical oscillation. In some instances it may be preferred to have the mirror M scan the screen first from bottom to top, and then from top to bottom. In this event the speed of rotation of the motor 39 need be but half of that required when scanning in a single direction, and the mirror, arm, rider etc. may be made of heavier and stronger material as the factor of inertia is not so great at the lower speed. The cam C may then comprise a twin spiral which provides uniform travel of the follower, for instance upwardly, during half a revolution, and uniform downward motion during the second half of the revolution.

In cases where it is desired to utilize vertical scanning in one direction only, as from top to bottom, the drum 49 may replace the mirror M as the function is similar in either case. The drum 49 rotates at such speed that the number of mirrors passing a given spot in one second is equal to the number of pictures desired per second. For instance, if the drum 49 is provided with 12 mirrors 51, and 24 pictures per second are required, the drum must rotate at two revolutions per second.

After the modulated light beam has been reflected from the disc D and the mirror M or the drum 49, it diverges along each dimension of its cross-section at an angle determined by the movement of the mirrors. In systems utilizing the mirror disc D and the oscillating mirror M, the angles of divergence are relatively small, such as from one to four degrees, so that unless other provision were made it would be necessary to place the screen at an unnecessarily great distance from the mirror M in order for the image to be of appreciable size. Provision may be made, therefore, to increase the angles of divergence so that the screen may be placed closer to the mirror M. If desired, the mirror M may comprise a reflecting body slightly convex longitudinally and if desired laterally, to thus increase the angles of divergence. Preferably however, the lens system employed with the light-modulator unit L is adapted to form an image of the illuminated aperture 16 in a plane in space between the mirror surfaces of the disc D and the screen S, said plane being normal to the central optic axis of the projected beam. A lens 53, positioned between the image of the illuminated aperture 16 and the screen S, forms a real and inverted image of the image in space on the screen S, and since this image is an image of the illuminated aperture 16, the real image appearing on the screen is, in effect, an image of the illuminated aperture. Since this real and inverted image of the illuminated aperture represents a single elemental area of the complete picture image, and since, by means of the scanning devices employed, the entire screen S is being scanned by this image of the illuminated aperture, the modulation of the light source illuminating the aperture will be reproduced at the proper areas on the screen S to form a complete picture image on said screen.

In operation, the source of light 12 is adjusted, the lenses 13, 17 and 53 properly positioned, and the aperture in the diaphragm 16 regulated so as to form a small spot of light which is a single elemental area of the complete picture image, on the screen S. Modulating signals are then imposed upon the beam so as to form a modulated light beam. The disc D and the mirror M or drum 49 are then set in motion in synchronism with each other and with the sending apparatus. Framing, or properly positioning the complete picture image on the screen S is next effected as by vertically adjusting the light modulator L, by adjustably positioning the motor 22 and the disc D, by pivotally adjusting the field of the motor 22 or by turning the handle 34. If the complete picture image is out of proportion, the pivotal movement of the mirror M is adjusted until this defect is corrected, as by moving the motor 39 and rider 45 toward or away from the mirror M.

The apparatus may be used for television transmission by illuminating an object or subject in the position normally occupied by the screen of the receiving apparatus. The mirror M and the disc D remain in their usual position, but instead of a light-modulating means L, a photocell is employed, positioned behind the diaphragm 16 in the position at present occupied by the prism 14. The photocell leads connect with amplifying and transmitting equipment in the usual manner.

Referring now to Fig. 4 the foregoing scanner for a television transmitting apparatus is illustrated. In this illustration the screen S is replaced with the object O to be televised. Instead of the receiver R and light modulating means L, only the aperture plate 16 and lens 17 of which are retained, there is substituted the photo-electric cell P and the amplifying and transmitting equipment V. In the foregoing manner the apparatus is, as previously set out, readily arranged as a scanner for a transmitter, the operation of which is at once clear to those skilled in the art and familiar with the functioning of the components.

It is to be understood that it is not necessary to use mirrors on the disc D and with the drum 49 as we may use prisms, lenses or any other optical means for obtaining similar results. Various other modifications may be made without departing from the scope of the invention as we contemplate any construction properly within the scope of the appended claims. For example the cam C may be formed so as to cause motion of the mirror M other than one of constant angular velocity during the scanning operation. The variable angular velocity imparted to the mirror M during scanning, by reason of the special shape or form of the cam C, is not to be confused with a uniform slow angular motion in one direction of oscillation of the mirror M and the quick return in the other direction of oscillation of said mirror, such as would be imparted to the mirror by a plain spiral cam C of the type shown in Fig. 3 of the accompanying drawings, and wherein the vertical scanning of a single frame is effected only during the uniform slow angular motion of the mirror M. The term "variable angular velocity" as used herein, refers to a variable angular movement imparted to the mirror M during its oscillation in one direction, to effect vertical scanning, i. e., the interchangeable cam C may be so shaped and proportioned as to impart to the mirror M a variable angular velocity during the actual scanning movement of the mirror, and may still, if desired, return the mirror to its initial position by a quick return movement. By way of illustration, the motion imparted to the mirror M by the cam C may be of an irregular type, due to predetermined variations in the cam surface, so that reception of clear and undistorted television pictures is possible only to those in possession of a cam C which is of like configuration to the cam employed at the transmitting station. In the claims the term scanning member will be used to designate any optical contrivance which may be used to obtain scanning. Certain other elements in the mechanism may obviously be revised without departing from the scope of the invention.

We claim:

1. Means translating electrical fluctuations from a sending station into visual images of high definition at a location remote from origin, comprising a light source and the necessary means for transforming the fluctuations into a modulated light beam, a screen, an aperture device between said light modulating means and said screen having an opening of predetermined size and configuration, means arranged to produce an image of the aperture opening on said screen, a single high speed lineal scanner having a multiplicity of light receiving means, upon at least each one of which there is successively concentrated an image of the light source, and adjustable for speed synchronization with a corresponding sending element at the originating station, a second lineal scanner arranged to move the light beam perpendicularly to the direction of movement imparted to the light beam by the first scanner and moved at a frequency synchronized with the frequency of a cooperating element of the originating station, and means adjusting the phase relation of the scanners to correspond to the phasing at the originating station.

2. In a television apparatus having a first scanner and a second scanner for intercepting a beam of modulated light and for moving said beam in mutually perpendicular directions to project said modulated beam progressively upon successive portions of a viewing screen as a picture image, the combination comprising means for concentrating said beam as a luminous spot corresponding to an elemental area of said picture image; means between said luminous spot and said first scanner for forming an image of said luminous spot in space between said first scanner and said screen; and a lens positioned between said image in space and said screen for forming on said screen an enlarged image of said image in space.

3. In a television apparatus having a first scanner and a second scanner for intercepting a beam of modulated light and for moving said beam in mutually perpendicular directions to project said modulated beam progressively upon successive portions of a viewing screen as a picture image, the combination comprising a plate provided with an aperture corresponding to an elemental area of said picture image located in the path of said beam between the source of said light beam and said first scanner; means positioned between said plate and said first scanner for forming an image of said aperture in space at a point between said first scanner and said screen; and a lens positioned between said image in space and said screen for forming on said screen an enlarged image of said image in space.

4. A mechanical television scanning apparatus comprising means for modulating a beam of light projected through an aperture; a first scanner comprising a rotatable disc provided with scanning elements adjacent to its periphery for successively scanning said beam; a second scanner for scanning said beam in a direction perpendicular to that of said first scanner; a screen; means focussed on said aperture for forming during operation of said scanners a relatively small complete television image between said second scanner and said screen; and means for enlarging said image and projecting the same upon said screen.

5. In a television scanning mechanism, an oscillatory scanning element, a cam, an arm extending from said cam to said element, a cam follower on said arm, and means for adjusting the position of said follower on said arm to adjust the amplitude of oscillation of said element independently of said cam.

6. In a method of television, the steps of forming an image of an illuminated aperture in space, forming an image of the image in space on a screen, and moving the image on the screen to effect scanning.

7. In a television system, wherein a beam of modulated light is successively scanned in mutually perpendicular directions to project said beam as a picture image upon a screen, the steps comprising concentrating said modulated beam as a luminous spot corresponding to an elemental area of said picture image; forming an image of said luminous spot in space in a plane located between the first scanner and said screen; and forming upon said screen an enlarged image of said image in space.

8. In a method for creating a television image, the steps of scanning in two dimensions, forming in space a moving image of an illuminated aperture, and forming a visible image of the moving image on a screen.

9. In television apparatus, a light source, scanning means, means concentrating the light into a beam forming an image of the source upon or closely adjacent the scanning means, an apertured member in the path of said light beam between said source and scanning means, a screen remote from said scanning means, and means forming an image of the aperture on said screen.

10. A television transmission method comprising the steps of forming an optical image of the object to be televised in space, forming an optical image of said image in space on an apertured plate, and moving said image on said apertured plate in two dimensions to effect scanning.

STEWART L. CLOTHIER.
HAROLD C. HOGENCAMP.